United States Patent
Kim et al.

(10) Patent No.: US 9,912,435 B2
(45) Date of Patent: Mar. 6, 2018

(54) NONLINEAR PENALTY ESTIMATION USING SPECTRAL INVERSION IN OPTICAL TRANSPORT NETWORKS

(71) Applicant: Fujitsu Limited, Kawasaki-shi, Kanagawa (JP)

(72) Inventors: Inwoong Kim, Allen, TX (US); Olga Vassilieva, Plano, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 15/015,880

(22) Filed: Feb. 4, 2016

(65) Prior Publication Data

US 2016/0316283 A1 Oct. 27, 2016

Related U.S. Application Data

(60) Provisional application No. 62/151,262, filed on Apr. 22, 2015.

(51) Int. Cl.
| | | |
|---|---|---|
| H04B 10/08 | (2006.01) | |
| H04B 17/00 | (2015.01) | |
| H04B 10/12 | (2006.01) | |
| H04B 10/00 | (2013.01) | |
| H04J 14/02 | (2006.01) | |
| H04B 10/079 | (2013.01) | |
| H04B 10/2543 | (2013.01) | |

(52) U.S. Cl.
CPC .... *H04J 14/0271* (2013.01); *H04B 10/07953* (2013.01); *H04B 10/2543* (2013.01); *H04J 14/0257* (2013.01)

(58) Field of Classification Search
USPC ..................... 398/45, 28, 147, 159
See application file for complete search history.

(56) References Cited

U.S. PATENT DOCUMENTS

| | | | | |
|---|---|---|---|---|
| 6,128,118 | A * | 10/2000 | Marcenac ......... | H04B 10/2531 398/1 |
| 6,504,972 | B2 * | 1/2003 | Watanabe ......... | H04B 10/2531 359/326 |
| 7,184,410 | B1 * | 2/2007 | Frankel ............ | H04B 10/25137 370/252 |
| 2003/0118347 | A1 * | 6/2003 | Papaparaskeva .. | H04B 10/2531 398/147 |

(Continued)

OTHER PUBLICATIONS

Carena, A., et al.; "Modeling of the Impact of Nonlinear Propagation Effects in Uncompensated Optical Coherent Transmission Links;" Journal of Lightwave Technology, vol. 30, Issue 10, pp. 1524-1539, 2012.

*Primary Examiner* — David Payne
*Assistant Examiner* — Pranesh Barua
(74) *Attorney, Agent, or Firm* — Baker Botts L.L.P.

(57) ABSTRACT

Methods and systems may estimate nonlinear penalties for optical paths using spectral inversion in optical transport networks. Certain values of nonlinear transfer functions for nonlinear penalty estimation may be pre-calculated for optical paths between given nodes. When an optical path computation for using spectral inversion between a given source node and a given destination node is desired, the pre-calculated values may be concatenated for improved computational efficiency.

12 Claims, 5 Drawing Sheets

(56) References Cited

U.S. PATENT DOCUMENTS

| | | | | |
|---|---|---|---|---|
| 2004/0197103 A1* | 10/2004 | Roberts | ............. | H04B 10/2543 398/159 |
| 2006/0250678 A1* | 11/2006 | Minzioni | ........... | H04B 10/2531 359/333 |
| 2012/0177386 A1* | 7/2012 | Zhou | .................. | H04B 10/2513 398/208 |
| 2015/0333825 A1* | 11/2015 | Kim | ................ | H04B 10/07953 398/26 |

* cited by examiner

NONLINEAR PENALTY ESTIMATION USING SPECTRAL INVERSION IN OPTICAL TRANSPORT NETWORKS

CROSS-REFERENCE TO RELATED APPLICATIONS

This application claims priority from U.S. Provisional Application No. 62/151,262 filed Apr. 22, 2015, entitled "NONLINEAR PENALTY ESTIMATION USING SPECTRAL INVERSION IN OPTICAL TRANSPORT NETWORKS".

BACKGROUND

Field of the Disclosure

The present disclosure relates generally to optical communication networks and, more particularly, to nonlinear penalty estimation using spectral inversion in optical transport networks.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various subsystems, such as amplifiers, dispersion compensators, multiplexer/demultiplexer filters, wavelength selective switches, spectral inverters, couplers, etc. configured to perform various operations within the network.

The distance that an optical signal can be transmitted with optical amplifiers for a given data rate depends on the impairments in the transmission system. Typically, the higher the data rate and the denser the wavelength spacing, the more susceptible the transmission system is to impairments. Impairments can include accumulated amplified spontaneous emission (ASE) noise, chromatic dispersion (CD), nonlinear optical effects (such as nonlinear phase noise), polarization mode dispersion, and polarization dependent loss. Digital signal processing (DSP) in coherent optical receivers may compensate for linear impairments such as CD, polarization mode dispersion and polarization dependent loss effectively. Intra-channel nonlinear impairment may also be compensated using digital back propagation in a coherent optical receiver with DSP, but such compensation may involve relatively extensive computational resources, which increases with optical signal bandwidth and is economically undesirable.

Nonlinear phase noise (NLPN) may be mitigated by mid-span spectral inversion when the optical signal is transmitted across multiple spans. Mid-span spectral inversion may be achieved optically (using optical phase conjugation based on an optical parametric process) or electronically (using an optical-electrical-optical (OEO) conversion). Accordingly, spectral inverters may change or maintain the wavelength after performing spectral inversion. The accumulated CD and NLPN of an optical signal may become reversed after spectral inversion is performed. Thus, to have optimal compensation of CD and NLPN, placement of spectral inverters has typically been limited to a central location (the mid-point) of a transmission link, such that the link is symmetric with respect to the spectral inversion. In real world systems, symmetric placement for spectral inverters (at the mid-point of the transmission link) may not be feasible or practical.

SUMMARY

In one aspect, a disclosed method is for a method for estimating nonlinear noise in optical transport networks for optical paths. The method may include identifying a candidate path in an optical transport network, the candidate path comprising K number of nodes designated 1 to K. In the method, for each value of a positive integer k such that ($1<k<K$), the method may include, based on a spectral inversion node functional at node k, calculating a first value based on nonlinear transfer function integrals for each link from node 1 to node k, where the first value represents nonlinear noise in links before the spectral inversion node along the candidate path. The method, for each value of the integer k, may further include calculating a second value based on nonlinear transfer function integrals for each link from node k to node K, the second value representing nonlinear noise in links after the spectral inversion node along the candidate path, and adding the first value and the second value to obtain a third value as a function of k. The method may also include selecting the value of k based on the third value, wherein the spectral inversion node is placed at node k in the candidate path.

In any of the disclosed embodiments of the method, selecting the value of k may further include selecting the value of k based on a minimum value of the third value.

In any of the disclosed embodiments of the method, calculating the first value may further include retrieving nonlinear transfer function integral values for each link from node 1 to node k, adding an accumulated term for phase shift by dispersion to each of the integral values for each link from node 1 to node k, concatenating the integral values for each link from node 1 to node k, multiplying the concatenated integral values by a phase shift exponential term corresponding to a dispersion compensation module located at the spectral inversion node, and phase conjugating the integral values for each link from node 1 to k.

In any of the disclosed embodiments of the method, calculating the second value may further include retrieving nonlinear transfer function integral values for each link from node k to node k, adding an accumulated term for phase shift by dispersion to each of the integral values for each link from node k to node K, concatenating the integral values for each link from node k to node K, and dividing the concatenated integral values by a phase shift exponential term for dispersion prior to node k.

In another aspect, a disclosed network management system is for estimating nonlinear noise in optical transport networks for optical paths. The network management system may include a processor enabled to access a memory media storing instructions executable by the processor. In the network management system, the instructions may be executable by the processor to identify a candidate path in an optical transport network, the candidate path comprising K number of nodes designated 1 to K. In the network management system, for each value of a positive integer k such that ($1<k<K$), the instructions may be executable to, based on a spectral inversion node functional at node k, calculate a first value based on nonlinear transfer function integrals for each link from node 1 to node k, where the first value represents nonlinear noise in links before the spectral inversion node along the candidate path. In the network management system, for each value of a positive integer k, instructions may be executable to calculate a second value based on nonlinear transfer function integrals for each link from node k to node K, the second value representing nonlinear noise in links after the spectral inversion node along the candidate path, and add the first value and the second value to obtain a third value as a function of k. In the network management system, the instructions may be executable to select the value of k based on the third value, wherein the spectral inversion node is placed at node k in the candidate path.

In any of the disclosed embodiments of the network management system, the instructions to select the value of k may further include instructions to select the value of k based on a minimum value of the third value.

In any of the disclosed embodiments of the network management system, the instructions to calculate the first value may further include instructions to retrieve nonlinear transfer function integral values for each link from node 1 to node k, add an accumulated term for phase shift by dispersion to each of the integral values for each link from node 1 to node k, concatenate the integral values for each link from node 1 to node k, multiply the concatenated integral values by a phase shift exponential term corresponding to a dispersion compensation module located at the spectral inversion node, and phase conjugate the integral values for each link from node 1 to k.

In any of the disclosed embodiments of the network management system, the instructions to calculate the second value may further include instructions to retrieve nonlinear transfer function integral values for each link from node k to node K, add an accumulated term for phase shift by dispersion to each of the integral values for each link from node k to node K, concatenate the integral values for each link from node k to node K, and divide the concatenated integral values by a phase shift exponential term for dispersion prior to node k.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENTS

Figure 1:
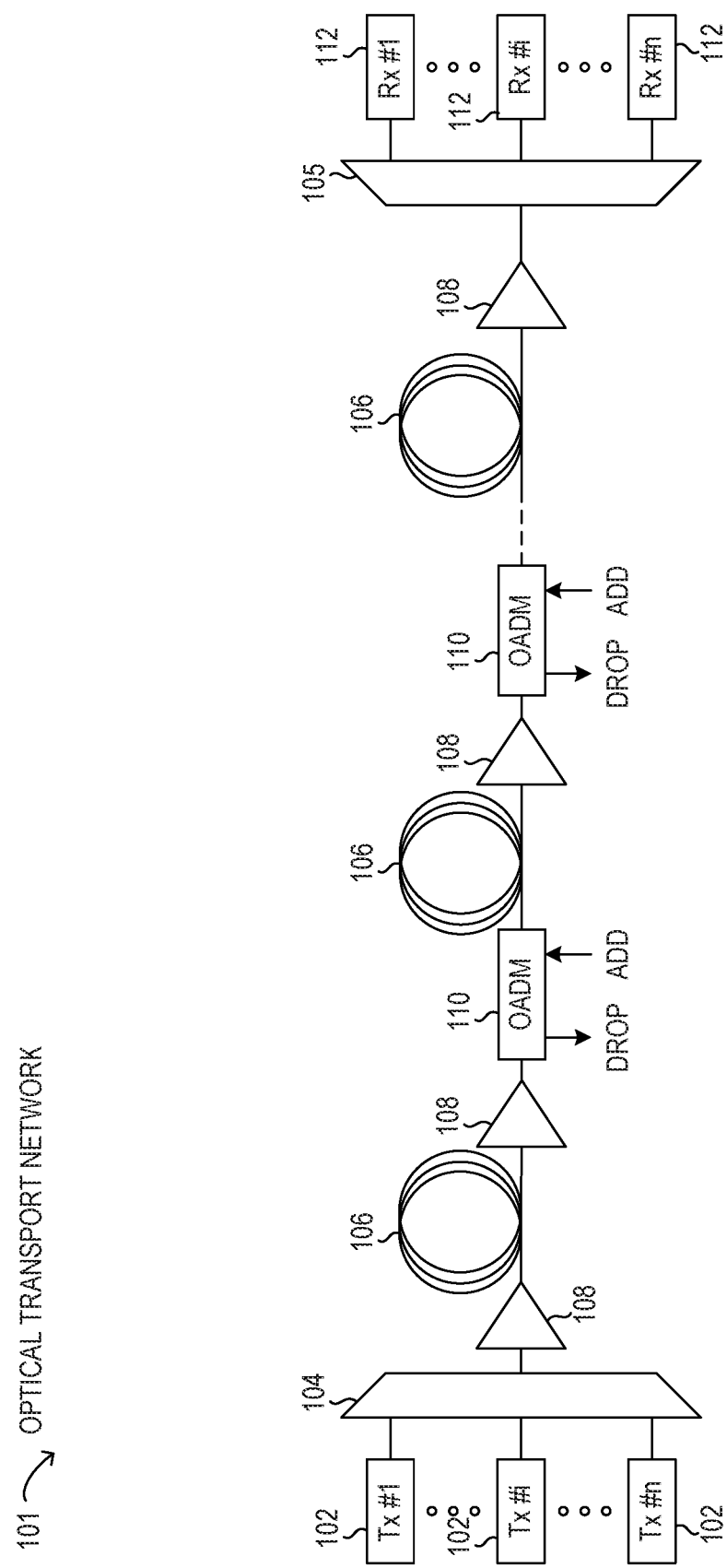
FIG. 1 is a block diagram of selected elements of an embodiment of an optical transport network for superchannel subcarrier monitoring.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the Baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical super-channel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may include nodes that perform spectral inversion. Spectral inversion converts an optical signal to a phase-conjugated optical signal. Spectral inversion can extend optical reach by mitigating nonlinear distortion. As noted, spectral inversion may be typically performed at a central location of a transmission link (optical path) to reverse accumulated linear and non-linear distortion. In many instances, other locations besides the central location of the transmission link may be equipped for spectral inversion, referred to as 'asymmetric' spectral inversion, which may be desirable for economic or practical reasons. However, the effects of certain asymmetrical implementations of spectral inversion may be difficult to predict, because of the computational intractability of typical network simulations. As will be described in further detail herein, methods and systems are disclosed for modeling the propagation of optical signals transmitted over optical transport network 101 with spectral inversion, including nonlinear penalty estimation using spectral inversion. The methods and systems disclosed herein for nonlinear penalty estimation using spectral inversion may enable efficient calculation of the nonlinear penalties. The methods and systems disclosed herein for nonlinear penalty estimation using spectral inversion may enable economically feasible evaluation of numerous different implementations of spectral inversion, including symmetric and asymmetric placement of a spectral inversion node with respect to optical transmission paths. The methods and systems disclosed herein for nonlinear penalty estimation using spectral inversion may enable improved performance and utilization of optical transport networks, by decreasing the computational resources used for nonlinear penalty estimation, thereby enabling evaluation of additional and different uses of spectral inversion than was typically implemented.

Figure 2:
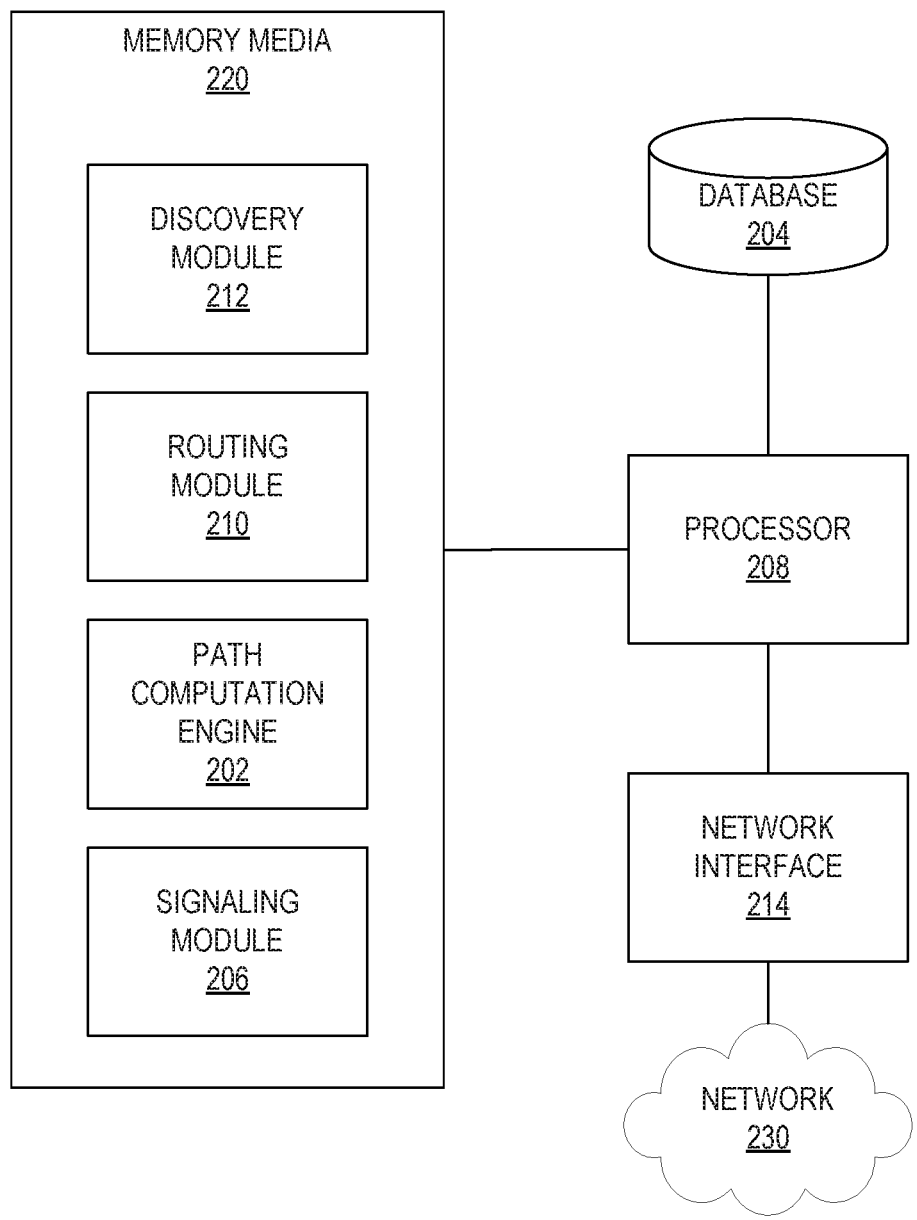
FIG. 2 is a block diagram of selected elements of an embodiment of an optical control plane system for superchannel subcarrier monitoring.

Referring now to FIG. 2, a block diagram of selected elements of an embodiment of control system 200 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, control system 200 may be configured to interface with a person (a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network element, for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical transport network 101. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, path computation engine 202 may provide functionality for evaluating and determining candidate paths for a given pair of source and destination nodes in an optical network, such as optical transport network 101 in FIG. 1. In this effort, path computation engine 202 may use nonlinear penalty estimates for placement of spectral inversion (SI). The nonlinear penalty estimates may be generated using nonlinear noise estimation methods and tools, as disclosed in detail in the addendum, for optical transmission systems employing spectral inversion. Specifically, certain nonlinear transfer functions for nonlinear penalty estimation may be integrated along a fiber path. The integration along the fiber path may be pre-calculated between nodes. The pre-calculated values may be stored in a memory and used to improve efficiency of the nonlinear noise estimation tool. The pre-calculated portions may be concatenated appropriately along the optical path between source and destination nodes. The concatenation may be performed by a path computation module, such as path computation engine 202. In this manner, wavelength, routing assignment and spectral inversion (SI) placement in optical network may support SI with or without wavelength (or spectral slot) conversion.

As described herein, an analytical model for nonlinear noise estimation for candidate paths may enable determination of ideal placement of spectral inversion nodes for nonlinear noise mitigation in optical transport networks. The analytical model is based on a Volterra transfer function of optical fiber and a Gaussian noise model. The Volterra transfer function, expressed as a series expansion, may provide a frequency domain solution for transmission over a single-mode optical fiber. The Gaussian noise model may enable approximation of nonlinear noise power of optical signals transmitted along uncompensated optical links.

Figure 3:
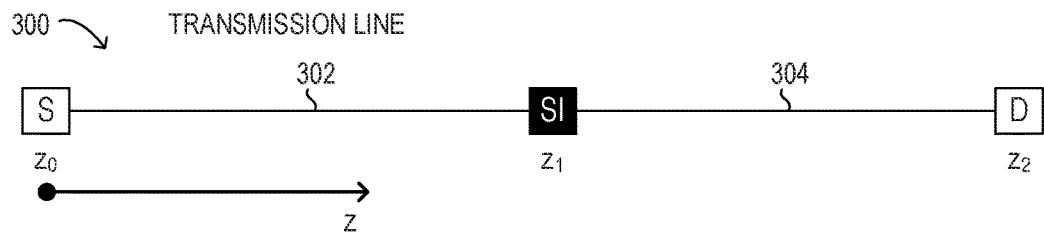
FIG. 3 is a schematic diagram of selected elements of an embodiment of transmission line model.

Referring now to FIG. 3, a schematic diagram of selected elements of an embodiment of a transmission line model 300 is illustrated. As shown, transmission line model 300 may represent a simple transmission link (an optical fiber path) between a source node S and a destination node D, between which a spectral inversion node SI is placed. Link 302 spans between source node S and spectral inversion node SI, while link 304 spans between spectral inversion node SI and destination node D. The propagation distance along links 302, 304 in transmission line model 300 is represented by axis z along the optical fiber path in a propagation direction, where source node S is located at distance $z_0$, spectral inversion node SI is located at distance $z_1$, and destination node D is located at distance $z_2$. Using transmission line model 300, certain characteristics of a simple optical transmission line may be defined in terms of:
  optical angular frequency $\omega$;
  propagation distance z; and
  link number k (for total K number of links).
Specifically:
  $G_k(z)$ is a logarithmic power profile for a given link k as a function of z;
  $C_k(z)$ is a cumulative dispersion along the optical fiber for a given link k as a function of z;
  $\tilde{A}_z(\omega)$ is a Fourier transform of the slowly varying complex envelope of electric field;

$H_{1,k}(\omega)$ is a linear transfer function for the k-th link;
$\gamma_k$ a is a nonlinear coefficient of fiber for the k-th link;
$\delta_{NL,k}(\omega)$ is a nonlinear perturbation for the k-th link;
$\delta_{NL}(\omega)$ is the total nonlinear perturbation for all links;
$\zeta_k$ is a nonlinear transfer function for the k-th link; and
$\zeta$ is the nonlinear transfer function for all links.

Equations 1 and 2 define expressions for $G_k(z)$ and $C_k(z)$, respectively.

$$G_k(z) = \int_0^z [g_k(z') - \alpha_k(z')] dz' \qquad \text{Equation (1)}$$

$$C_k(z) = \int_0^z \beta_{2,k}(z') dz' \qquad \text{Equation (2)}$$

In Equation 1:
  $g_k$ is a gain coefficient; and
  $\alpha_k$ is a loss coefficient.
In Equation 2:
  $\beta_{2,k}$ is a group velocity dispersion in the k-th link.

In transmission line model 300, the input optical signal at source node S is given by $\tilde{A}_0(\omega)$, the optical signal entering spectral inversion node SI after exiting link 302 is given by $\tilde{A}_{z1}(\omega)$, the optical signal exiting spectral inversion node SI is given by $\tilde{A}_{z1}*(\omega)$ (the phase conjugated output of $\tilde{A}_{z1}(\omega)$), and the optical signal arriving at destination node D is given by $\tilde{A}_{z2}(\omega)$. Accordingly, the output optical signal from link 302, where k=1, may be expressed as a linear transfer function of the combination of the input optical signal and the nonlinear perturbation, as given by Equation 3.

$$A_{z1}(\omega) = H_{1,1}(\omega)[\tilde{A}_0(\omega) + \delta_{NL,1}(\omega)] \qquad \text{Equation (3)}$$

In Equation 3, the nonlinear perturbation is given by Equation 4.

$$\delta_{NL,1}(\omega) = j\gamma_1 \iiint_0^{z_1} e^{(G_1(z') + jC_1(z')\Delta\Omega)} dz' \tilde{S}_0(\omega_1, \omega_2, \omega) d\omega_1 d\omega_2 \qquad \text{Equation (4)}$$

In Equation 4:
  j is the complex square root of −1;

$$\Delta\Omega = (\omega - \omega_1)(\omega_2 - \omega_1); \text{ and} \qquad \text{Equation (5)}$$

$$\tilde{S}_0(\omega_1, \omega_2, \omega) = \tilde{A}_0(\omega_1)\tilde{A}_0*(\omega_2)\tilde{A}_0(\omega - \omega_1 + \omega_2). \qquad \text{Equation (6)}$$

Accordingly, the nonlinear transfer function for link 302 may be defined by Equation 7.

$$\zeta_1(\Delta\Omega) = \gamma_1 \int_0^{z_1} e^{(G_1(z') + jC_1(z')\Delta\Omega)} dz' \qquad \text{Equation (7)}$$

Then, Equation 7 may be substituted into Equation 4 to yield Equation 8.

$$\delta_{NL,1}(\omega) = j\zeta_1(\Delta\Omega) \iint \tilde{S}_0(\omega_1, \omega_2, \omega) d\omega_1 d\omega_2 \qquad \text{Equation (8)}$$

Because spectral inversion node SI is placed after link 302, the input to link 304 becomes $\tilde{A}_{z1}*(\omega)$ due to phase conjugation. Then, the output of link 304 may be given by Equation 9.

$$\tilde{A}_{z2}(\omega) = H_{1,2}(\omega)[\tilde{A}_{z1}*(\omega) + \delta_{NL,2}(\omega)] \qquad \text{Equation (9)}$$

Then, the nonlinear perturbation for link 304 may be given by Equation 10.

$$\delta_{NL,2}(\omega) = j\gamma_2 \iiint_0^{(z_2 - z_1)} e^{(G_2(z') + jC_2(z')\Delta\Omega)} dz' \tilde{S}_{z1}*(\omega_1, \omega_2, \omega) d\omega_1 d\omega_2 \qquad \text{Equation (10)}$$

In Equation 10:

$$\tilde{S}_{z1}*(\omega_1, \omega_2, \omega) \approx H_{1,1}*(\omega) e^{e^{(G_1(z1) + jC_1(z1)\Delta\Omega)}} \tilde{S}_0*(\omega_1, \omega_2, \omega) \qquad \text{Equation (11)}$$

Equation 11 may be used as a valid approximation by considering only the linear term of $A_{z1}(\omega)$ because all terms proportional to the product $(\gamma_1\gamma_2)$ or higher order nonlinear terms will be omitted in the final calculation form of total nonlinear perturbation. Then, the output optical signal of link 304 may be given by Equation 12.

$$\tilde{A}_{z2}(\omega)=H_{1,2}(\omega)[H_{1,1}^*(\omega)(\tilde{A}_0^*(\omega)+\delta_{NL,1}^*(\omega))+\delta_{NL,2}(\omega)] \quad \text{Equation (12)}$$

Equation 12 may be rewritten in terms of the total nonlinear perturbation, $\delta_{NL}\cdot(\omega)$, as given by Equation 13.

$$\tilde{A}_{z2}(\omega)=H_{1,1}^*(\omega)H_{1,2}(\omega)[\tilde{A}_0^*(\omega)+\delta_{NL}(\omega)] \quad \text{Equation (13)}$$

In Equation 13, the total nonlinear perturbation, $\delta_{NL}\cdot(\omega)$ may be given by Equation 14.

$$\delta_{NL}(\omega)=-j\iint \zeta(\Delta\Omega)\tilde{S}_0^*(\omega_1,\omega_2,\omega)d\omega_1 d\omega_2 \quad \text{Equation (14)}$$

Thus, the nonlinear transfer function for transmission line model 300 may be given by Equation 15.

$$\zeta(\Delta\Omega)=\gamma_1\int_0^{z1} e^{(G_1(z')+jC_1(z')\Delta\Omega)}dz'- \\ \gamma_2 e^{(G_1(z1)+jC_1(z1)\Delta\Omega}\int_0^{(z2-z1)} e^{(G_2(z')+jC_2(z')\Delta\Omega)}dz' \quad \text{Equation (15)}$$

Equation 15 may be rewritten as a concatenation of the nonlinear transfer functions for each link 302, 304, as given by Equation 16.

$$\zeta(\Delta\Omega)=\zeta_1^*(\Delta\Omega)-e^{(G_1(z1)+jC_1(z1)\Delta\Omega)}\zeta_2(\Delta\Omega) \quad \text{Equation (16)}$$

Figure 4:
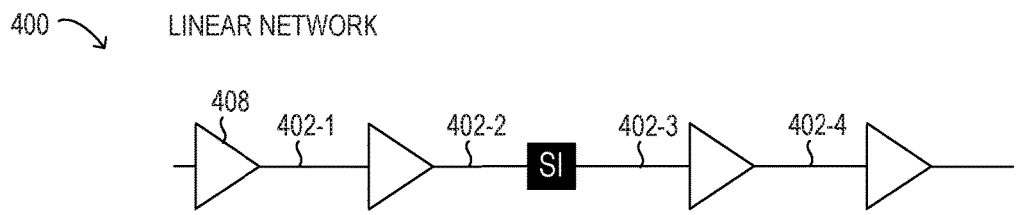
FIG. 4 is a schematic diagram of selected elements of an embodiment of linear network model.

Referring now to FIG. 4, a schematic diagram of selected elements of an embodiment of a linear network model 400 is illustrated. As shown, linear network model 400 may represent an optical fiber path having multiple links and a centrally located spectral inversion node SI. In the particular example embodiment shown in FIG. 4, linear network model 400 includes 4 links 402-1, 402-2, 402-3, and 402-4 (K=4). Between certain links a generic repeater 408 is placed to maintain a signal amplitude. Generic repeater 408 may be an optical amplifier, in various embodiments. Between link 402-2 and 402-3, a spectral inversion node (SI) has been put into operation. In linear network model 400:

$L_k$ is the length of the k-th link; and $\zeta_k(\Delta\Omega)$ is the nonlinear transfer function for the k-th link. Furthermore, it may be assumed that the output power for all repeaters 408 is constant and the same type of fiber is used for all k links 402. In this case, $G_k(z_k)=1$ and $\beta_2$ is the group velocity dispersion for each of the k links 402. Accordingly, the nonlinear transfer function for each link 402 may be defined by Equation 7, while the nonlinear transfer function for linear network model 400 may be expressed by Equation 17.

$$\zeta(\Delta\Omega)=[\zeta_1(\Delta\Omega)+e^{j\beta_2 L_1 \Delta\Omega}\zeta_2(\Delta\Omega)]^*+ \\ e^{-j\beta_2(L_1+L_2)\Delta\Omega}[\zeta_3(\Delta\Omega)+e^{j\beta_2 L_3 \Delta\Omega}\zeta_4(\Delta\Omega)] \quad \text{Equation (17)}$$

In Equation 17, the first bracketed term is a phase conjugation of the concatenated nonlinear transfer function for links 402-1 and 402-2. In Equation 17, the second bracketed term is the nonlinear transfer function for links 402-3 and 402-4 after spectral inversion node SI, which is multiplied by an exponential term describing the phase shift due to dispersion that is accumulated up to the spectral inversion node SI. Thus, Equation 17 demonstrates that the total nonlinear transfer function for a given optical path may be calculated using pre-calculated values for the nonlinear transfer functions for each individual link in the optical path because the nonlinear transfer functions do not depend on input signal. The ability to use pre-calculated values for given network links may represent a substantial benefit in using the methods and operations described herein for nonlinear penalty estimation in optical networks.

In Equation 17, the group velocity dispersion $\beta_2$ was assumed for a center frequency ($\omega_0$) of an optical signal transmitted over the optical path. When a dispersion compensation module (DCM) (not shown in FIG. 3) is added at the same location as spectral inversion node SI, the nonlinear transfer function for linear network model 400 may be expressed by Equation 18.

$$\zeta(\Delta\Omega)=e^{j\left(\frac{D\lambda_0^2}{2\pi c}\right)\Delta\Omega}[\zeta_1(\Delta\Omega)+e^{j\beta_2 L_1 \Delta\Omega}\zeta_2(\Delta\Omega)]^* + \\ e^{-j\beta_2(L_1+L_2)\Delta\Omega}[\zeta_3(\Delta\Omega)+e^{j\beta_2 L_3 \Delta\Omega}\zeta_4(\Delta\Omega)] \quad \text{Equation (18)}$$

In Equation 18:
c is the speed of light;
$\lambda_0=2\pi c/\omega_0$ is the wavelength corresponding to $\omega_0$; and $$e^{j\left(\frac{D\lambda_0^2}{2\pi c}\right)\Delta\Omega}$$

is a term representing a phase shift due to the DCM.
In Equations 17 and 18:
$e^{j\beta_2 L_1 \Delta\Omega}$ is a term representing an accumulated phase shift caused by phase mismatch due to dispersion over the propagation distance of link 402-1;
$e^{-j\beta_2(L_1+L_2)\Delta\Omega}$ is a term representing an accumulated phase shift caused by phase mismatch due to dispersion over the propagation distance up to spectral inversion node SI; and
$e^{j\beta_2 L_3 \Delta\Omega}$ is a term representing an accumulated phase shift caused by phase mismatch due to dispersion over the propagation distance of link 402-3 or after spectral inversion node SI.

In certain instances, a wavelength shift may be introduced at spectral inversion node SI in linear network model 400, where after the spectral inversion node SI, the center frequency shifts from $\omega_0$ to $\omega'_0$, such that the group velocity dispersion shifts from $\beta_2$ to $\beta'_2$. With a DCM and a center frequency shift at the spectral inversion node SI, the nonlinear transfer function for linear network model 400 may be expressed by Equation 19.

$$\zeta(\Delta\Omega)=e^{j\left(\frac{D\lambda_0^2}{2\pi c}\right)\Delta\Omega}[\zeta_1(\Delta\Omega)+e^{j\beta_2 L_1 \Delta\Omega}\zeta_2(\Delta\Omega)]^* + \\ e^{-j\beta_2(L_1+L_2)\Delta\Omega}[\zeta_3(\Delta\Omega)+e^{j\beta'_2 L_3 \Delta\Omega}\zeta_4(\Delta\Omega)] \quad \text{Equation (19)}$$

It is noted that spectral inversion node SI in linear network model 400 may be a pre-dispersed spectral inversion (PSI), in which the dispersion is compensated prior to spectral inversion node SI. In this manner, improved symmetry in terms of power and accumulated dispersion may be obtained. The dispersion compensation for PSI may be incorporated into Equations 18 and 19, when applicable.

Figure 5:
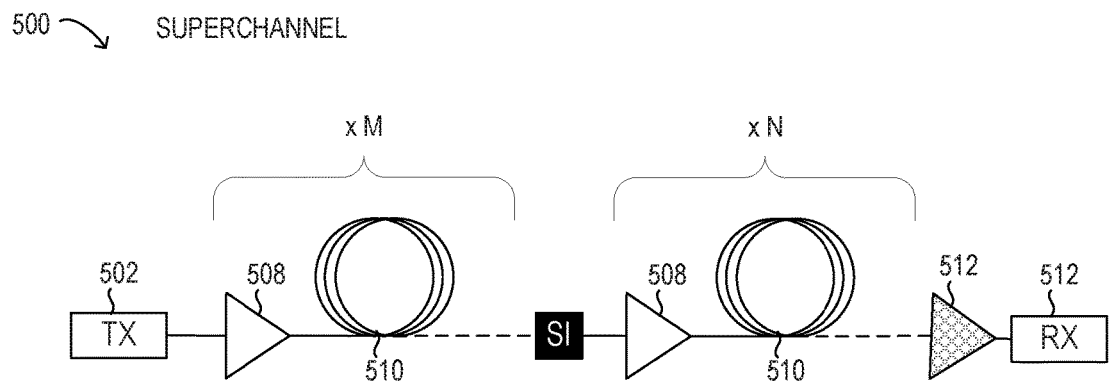
FIG. 5 is a schematic diagram of selected elements of an embodiment of superchannel model.

Referring now to FIG. 5, a schematic diagram of selected elements of an embodiment of a linear network model 400 is illustrated. As shown, linear network model 400 may represent an optical fiber path having multiple links and a centrally located spectral inversion node SI. In the particular example embodiment shown in FIG. 4, linear network model 400 includes 4 links 402-1, 402-2, 402-3, and 402-4 (K=4). Between certain links a generic repeater 408 is placed to maintain a signal amplitude. Generic repeater 408 may be an optical amplifier, in various embodiments. Between link 402-2 and 402-3, a spectral inversion node (SI) has been put into operation. In linear network model 400:

Referring now to FIG. 5, a schematic diagram of selected elements of an embodiment of a superchannel model 500 is illustrated. As shown, superchannel model 500 may represent an optical transport network transmitting a superchannel from transmitter 502 to receiver 512. In various embodiments, superchannel model 500 may represent optical transport network 101 (see FIG. 1). Specifically, superchannel model 500 comprises M number of spans of an ideal optical amplifier 508 and fiber link 510 after transmitter 502 and prior to spectral inversion node SI, and N number of spans of ideal optical amplifier/fiber link 510 after spectral inversion node SI. Prior to receiver 512, an amplified spontaneous noise source 512 has been placed. In various embodiments, superchannel model 500 may enable simulation of dual-polarized optical signals.

Based on a Gaussian noise model, the nonlinear noise power spectral density (PSD), $n_{NL}(\omega)$, for dual-polarized optical signals is given by Equation 20.

$$n_{NL}(\omega) = {}^{16}\!/_{27} \iint |\zeta(\Delta\Omega)|^2 f_G(\omega_1) f_G(\omega_2) f_G(\omega_1 - \omega_2 + \omega) \, d\omega_1 d\omega_2 \quad \text{Equation (20)}$$

In Equation 20:

$f_G$ is the power spectral density of an input optical signal exhibiting periodic white Gaussian noise.

By applying the assumption that an effective length of fiber is much smaller than the actual span length L, $|\zeta(\Delta\Omega)|$ may further be simplified as given by Equation 21 for superchannel model 500.

$$|\zeta(\Delta\Omega)| \approx \left| \frac{1}{\alpha + j\beta_2 \Delta\Omega} \frac{\sin(ML\beta_2\Delta\Omega/2)}{\sin(L\beta_2\Delta\Omega/2)} - \frac{1}{\alpha - j\beta_2\Delta\Omega} \frac{\sin(NL\beta_2\Delta\Omega/2)}{\sin(L\beta_2\Delta\Omega/2)} e^{jL\beta_2\Delta\Omega(N-M-2)/2} \right| \quad \text{Equation (21)}$$

In Equation 21:

$$\frac{1}{\alpha + j\beta_2\Delta\Omega} \frac{\sin(ML\beta_2\Delta\Omega/2)}{\sin(L\beta_2\Delta\Omega/2)}$$

is a conjugate of the nonlinear transfer function of the optical path before spectral inversion node SI;

$$\frac{1}{\alpha - j\beta_2\Delta\Omega} \frac{\sin(NL\beta_2\Delta\Omega/2)}{\sin(L\beta_2\Delta\Omega/2)}$$

is a nonlinear transfer function of the optical path after spectral inversion node SI; and $e^{jL\beta_2\Delta\Omega(N-M-2)/2}$ is an additional phase term.

For Equations 20 and 21, when using the Gaussian noise model for transmission of optical signals using spectral inversion, the nonlinear noise from each span is coherently combined. It is also noted that Equations 20 and 21 may be used for both single-carrier channel and superchannel transmission. The nonlinear noise power in a subcarrier may be calculated by integrating Equation 20 for a corresponding spectral bandwidth. The nonlinear noise power may then be converted to a Q-factor based on signal-to-noise ratio calculations.

It is noted that the analytical models described herein have been validated against optical path calculation estimates and have been found to accurately estimate nonlinear noise penalties for placement of spectral inversion nodes in optical transmissions networks. By using precalculated values, as described above, the computational efficiency of nonlinear noise penalty estimation may be substantially reduced using the methods and systems described herein.

Figure 6:
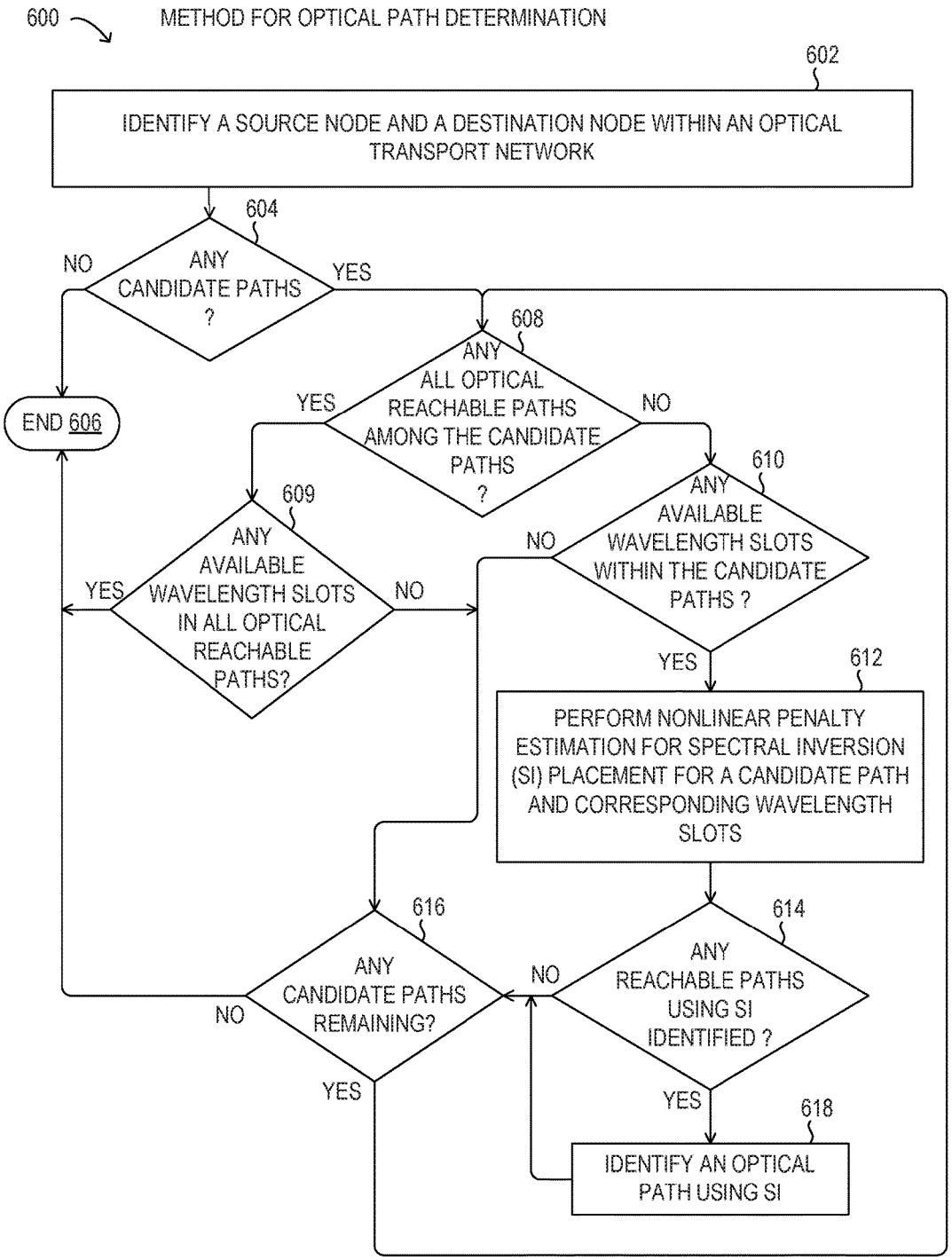
FIG. 6 is a flowchart of selected elements of an embodiment of a method for optical path determination with nonlinear penalty estimation using spectral inversion.

Referring now to FIG. 6, method 600 for optical path determination is shown in flowchart form. As shown method 600 may be performed for optical transport network 101 (see FIG. 1) using path computation engine 202, in particular embodiments, among others. It is noted that operations described with respect to method 600 may be omitted or rearranged in different embodiments.

Method 600 may begin at step 602 by identifying a source node and a destination node within an optical transport network. At step 604, a decision may be made whether any candidate paths between the source node and the destination node can be identified. When no candidate paths can be identified, the result of step 604 is NO and method 600 may end at step 606. When at least one candidate path is identified, the result of step 604 is YES, and a further decision may be made, at step 608, whether any all optical reachable paths can be identified among the candidate paths. When at least one all optical reachable path is identified, the result of step 608 is YES, a further decision may be made at step 609 whether any wavelength slots are available in the all optical reachable paths. When the result of step 609 is YES and wavelength slots are available in the all optical reachable paths, method 600 may end at step 606. When no optical reachable paths can be identified, the result of step 608 is NO. When no wavelength slots are available in the all optical reachable paths, the result of step 609 is NO, and method 600 may proceed to step 616. When the result of step 608 is NO, a further decision may be made, at step 610, whether any wavelength slots are available within the candidate paths. When no wavelength slots are available within the candidate paths, the result of step 610 is NO and method 600 may proceed to step 616. When wavelength slots are available within the candidate paths, the result of step 610 is YES, and at step 612, nonlinear penalty estimation for spectral inversion (SI) placement for a candidate path and corresponding wavelength slots may be performed (see also FIG. 7). After step 612, a decision may be made at step 614 whether any reachable paths using spectral inversion can be identified. When no reachable paths using spectral inversion can be identified, the result of step 614 is NO, and method 600 may proceed to step 616. When at least one reachable path using spectral inversion can be identified, the result of step 614 is YES, and at step 618, an optical path using spectral inversion is identified. In some embodiments (not shown), as soon as an optical path using spectral inversion is identified at step 618, method 600 may end without further evaluation of additional candidate paths. As shown in FIG. 6, method 600 may iterate to evaluate all candidate paths identified in step 604. Then, after step 618, a decision may be made at step 616 whether any candidate paths remain. When no candidate paths remain, the result of step 616 is NO, and method 600 may end at step 606. When more candidate paths remain, method 600 may then loop back to step 608.

Figure 7:
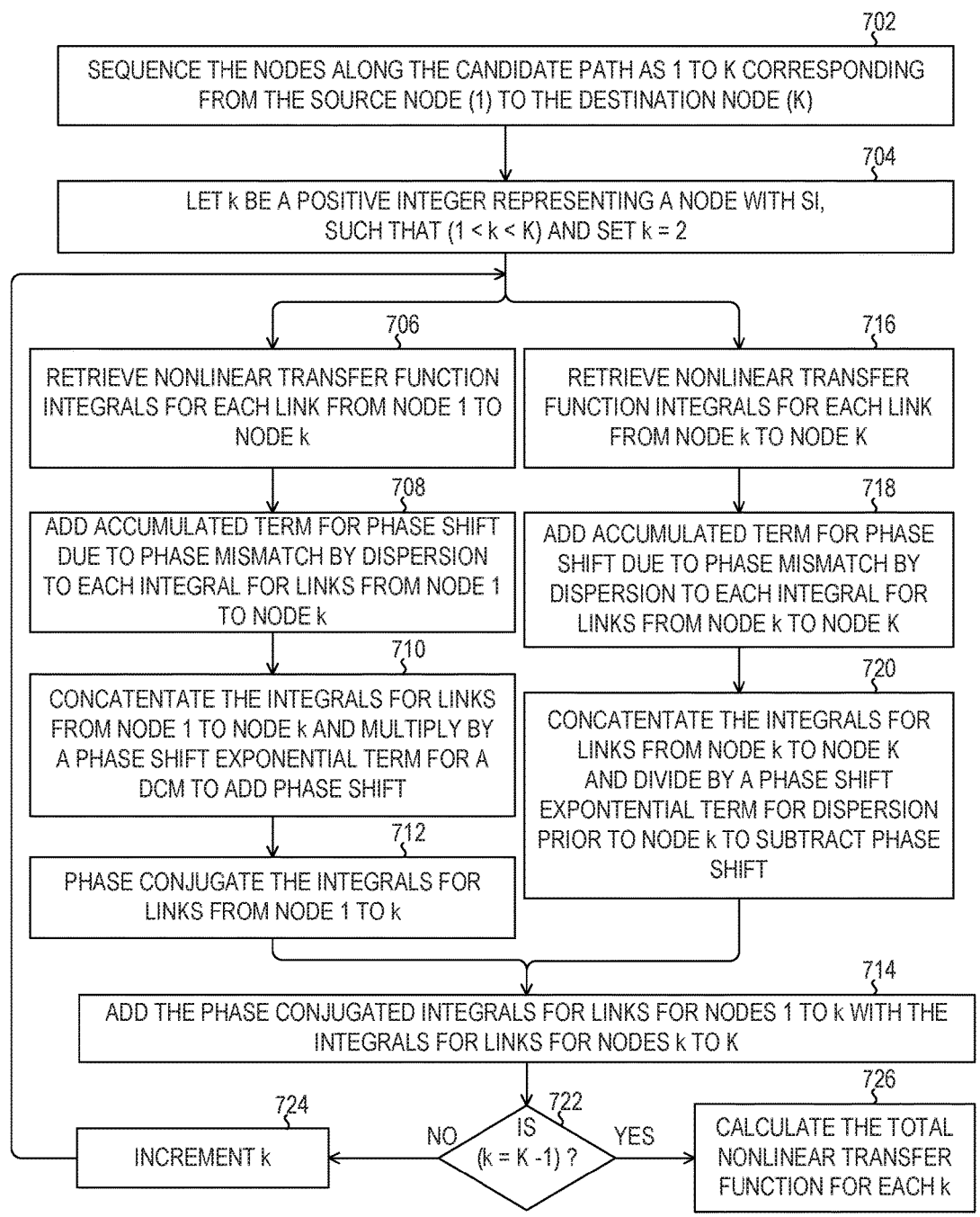
FIG. 7 is a flowchart of selected elements of an embodiment of a method for nonlinear penalty estimation using spectral inversion.

Referring now to FIG. 7, method 612 for nonlinear penalty estimation using spectral inversion, as disclosed herein, is shown in flowchart form. As shown method 612 may represent an embodiment of step 612 in method 600 (see FIG. 6). It is noted that operations described with respect to method 612 may be omitted or rearranged in different embodiments.

Prior to step 702, it may be assumed that a candidate path in an optical network has been identified (see also method 600). Method 612 may begin at step 702 by sequencing the nodes along the candidate path as 1 to K corresponding from the source node (1) to the destination node (K). At step 704, method 612 may let k be a positive integer representing a node with spectral inversion (SI), such that (1<k<K) and may set k=2. It is noted that in various embodiments, different methods for selecting or iterating through values of k may be used. Then, method 612 may perform steps to generate nonlinear transfer function integrals for node 1 to k in steps 706, 708, 710, and 712, and for node k to K in steps 716, 718, and 720.

At step 706, nonlinear transfer function integrals may be retrieved for each link in the candidate path from node 1 to node k. The nonlinear transfer function integrals may be precalculated and retrieved from a repository, such as database 204 (see FIG. 2), in step 706. The precalculation and retrieval may represent a significant computational improvement over other methods, because the precalculation can be performed in advance when the network is provisioned, while the precalculated values may be retrieved over and over again for different path evaluation purposes with very low computational effort. At step 708, an accumulated term for phase shift due to phase mismatch by dispersion may be added to each integral for links from node 1 to node k. At step 710, the integrals for links from node 1 to node k may be concatenated and multiplied by a phase shift exponential term for a dispersion compensation module (DCM, when present) to add phase shift. At step 712, the integrals may be phase conjugated for links from node 1 to node k.

At step 716, nonlinear transfer function integrals may be retrieved for each link in the candidate path from node k to node K. At step 718, an accumulated term for phase shift due to phase mismatch by dispersion may be added to each integral for links from node k to node K. At step 720, the integrals for links from node k to node K may be concatenated and divided by a phase shift exponential term for dispersion prior to node k to subtract phase shift.

At step 714, the phase conjugated integrals for links for nodes 1 to k may be added with the integrals for links for nodes k to K. Then, at step 722, a decision may be made whether (k=K−1). When (k≠K−1) and the result of step 722 is NO, additional nodes for placing a spectral inversion node remain to be evaluated, and at step 724, k is incremented. After step 724, method 612 may loop back to steps 706 and 716, which may be performed in parallel as shown. When (k=K−1) and the result of step 722 is YES, no additional nodes for placing a spectral inversion node remain to be evaluated, and at step 726, the total nonlinear transfer function for each value of k may be calculated.

In summary, methods and systems for nonlinear noise estimation for optical transmission systems with spectral inversion is disclosed based on a Volterra series transfer function of optical fiber and a Gaussian noise model. An analytic model is disclosed that has two integral terms: one term is a is nonlinear transfer function which describes optical signal propagation along a nonlinear optical fiber and another term is an integral of a nonlinear transfer function and a product of an input signal in frequency domain. The integration values along the optical fiber may be pre-calculated between nodes, which values can be stored in a repository and retrieved, as needed. The precalculation and retrieval of the integration values may be used to improve computational efficiency of nonlinear noise estimation, which may make accurate nonlinear noise estimation more accessible and easier to use in various path computation applications.

The pre-calculated integration values can be concatenated appropriately for links along the optical path between the source and destination nodes, which may be provided by a path calculation module. An appropriate accumulated phase shift due to chromatic dispersion may be added during the concatenation. The concatenated integrals may be conjugated when a spectral inversion node is placed in the optical path. When a dispersion compensation module (DCM) is placed before the spectral inversion node, an appropriate phase shift may be added before the concatenation.

As disclosed herein, methods and systems may estimate nonlinear penalties for optical paths using spectral inversion in optical transport networks. Certain values of nonlinear transfer functions for nonlinear penalty estimation may be pre-calculated for optical paths between given nodes. When an optical path computation for using spectral inversion between a given source node and a given destination node is desired, the pre-calculated values may be concatenated for improved computational efficiency.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for estimating nonlinear noise in optical transport networks for optical paths, the method comprising:
   identifying a candidate path in an optical transport network, the candidate path comprising K number of nodes designated 1 to K;
   for each value of a positive integer k such that (1<k<K):
      based on a spectral inversion node functional at node k, calculating a first value based on nonlinear transfer function integrals for each link from node 1 to node k, the first value representing nonlinear noise in links before the spectral inversion node along the candidate path, calculating the first value includes:
         retrieving nonlinear transfer function integral values for each link from node 1 to node k,
         adding an accumulated term for phase shift by dispersion to each of the integral values for each link from node 1 to node k,
         concatenating the integral values for each link from node 1 to node k,
         multiplying the concatenated integral values by a phase shift exponential term corresponding to a dispersion compensation module located at the spectral inversion node, and
         phase conjugating the integral values for each link from node 1 to k;
      calculating a second value based on nonlinear transfer function integrals for each link from node k to node K, the second value representing nonlinear noise in links after the spectral inversion node along the candidate path; and
      adding the first value and the second value to obtain a third value as a function of k; and
   selecting the value of k based on the third value, wherein the spectral inversion node is placed at node k in the candidate path.

2. The method of claim 1, wherein selecting the value of k further comprises:
   selecting the value of k based on a minimum value of the third value, the minimum value of the third value occurring when k=K−1.

3. The method of claim 1, wherein calculating the second value further comprises:

retrieving nonlinear transfer function integral values for each link from node k to node K;

adding an accumulated term for phase shift by dispersion to each of the integral values for each link from node k to node K;

concatenating the integral values for each link from node k to node K; and dividing the concatenated integral values by a phase shift exponential term for dispersion prior to node k.

4. A network management system for estimating nonlinear noise in optical transport networks for optical paths, the network management system comprising:

a processor enabled to access a memory media storing instructions executable by the processor to:

identify a candidate path in an optical transport network, the candidate path comprising K number of nodes designated 1 to K;

for each value of a positive integer k such that (1<k<K):
based on a spectral inversion node functional at node k, calculate a first value based on nonlinear transfer function integrals for each link from node 1 to node k, the first value representing nonlinear noise in links before the spectral inversion node along the candidate path, calculate the first value includes:
retrieving nonlinear transfer function integral values for each link from node 1 to node k,
adding an accumulated term for phase shift by dispersion to each of the integral values for each link from node 1 to node k,
concatenating the integral values for each link from node 1 to node k,
multiplying the concatenated integral values by a phase shift exponential term corresponding to a dispersion compensation module located at the spectral inversion node, and
phase conjugating the integral values for each link from node 1 to k;
calculate a second value based on nonlinear transfer function integrals for each link from node k to node K, the second value representing nonlinear noise in links after the spectral inversion node along the candidate path; and
add the first value and the second value to obtain a third value as a function of k; and
select the value of k based on the third value, wherein the spectral inversion node is placed at node k in the candidate path.

5. The network management system of claim 4, wherein the instructions to select the value of k further comprise instructions to:

select the value of k based on a minimum value of the third value, the minimum value of the third value occurring when k=K−1.

6. The network management system of claim 4, wherein the instructions to calculate the second value further comprise instructions to:

retrieve nonlinear transfer function integral values for each link from node k to node K;

add an accumulated term for phase shift by dispersion to each of the integral values for each link from node k to node K;

concatenate the integral values for each link from node k to node K; and divide the concatenated integral values by a phase shift exponential term for dispersion prior to node k from.

7. A method for estimating nonlinear noise in optical transport networks for optical paths, the method comprising:

identifying a candidate path in an optical transport network, the candidate path comprising K number of nodes designated 1 to K;

for each value of a positive integer k such that (1<k<K):
based on a spectral inversion node functional at node k, calculating a first value based on nonlinear transfer function integrals for each link from node 1 to node k, the first value representing nonlinear noise in links before the spectral inversion node along the candidate path;
calculating a second value based on nonlinear transfer function integrals for each link from node k to node K, the second value representing nonlinear noise in links after the spectral inversion node along the candidate path, calculating the second value includes:
retrieving nonlinear transfer function integral values for each link from node k to node K,
adding an accumulated term for phase shift by dispersion to each of the integral values for each link from node k to node K,
concatenating the integral values for each link from node k to node K, and
dividing the concatenated integral values by a phase shift exponential term for dispersion prior to node k; and
adding the first value and the second value to obtain a third value as a function of k; and
selecting the value of k based on the third value, wherein the spectral inversion node is placed at node k in the candidate path.

8. The method of claim 7, wherein selecting the value of k further comprises:

selecting the value of k based on a minimum value of the third value, the minimum value of the third value occurring when k=K−1.

9. The method of claim 7, wherein calculating the first value further comprises:

retrieving nonlinear transfer function integral values for each link from node 1 to node k;

adding an accumulated term for phase shift by dispersion to each of the integral values for each link from node 1 to node k;

concatenating the integral values for each link from node 1 to node k;

multiplying the concatenated integral values by a phase shift exponential term corresponding to a dispersion compensation module located at the spectral inversion node; and phase conjugating the integral values for each link from node 1 to k.

10. A network management system for estimating nonlinear noise in optical transport networks for optical paths, the network management system comprising:

a processor enabled to access a memory media storing instructions executable by the processor to:

identify a candidate path in an optical transport network, the candidate path comprising K number of nodes designated 1 to K;

for each value of a positive integer k such that (1<k<K):
based on a spectral inversion node functional at node k, calculate a first value based on nonlinear transfer function integrals for each link from node 1 to node k, the first value representing nonlinear noise in links before the spectral inversion node along the candidate path;

calculate a second value based on nonlinear transfer function integrals for each link from node k to node K, the second value representing nonlinear noise in links after the spectral inversion node along the candidate path, calculate the second value includes:
   retrieving nonlinear transfer function integral values for each link from node k to node K;
   adding an accumulated term for phase shift by dispersion to each of the integral values for each link from node k to node K;
   concatenating the integral values for each link from node k to node K; and
   dividing the concatenated integral values by a phase shift exponential term for dispersion prior to node k from; and
add the first value and the second value to obtain a third value as a function of k; and
select the value of k based on the third value, wherein the spectral inversion node is placed at node k in the candidate path.

11. The network management system of claim 10, wherein the instructions to select the value of k further comprise instructions to:

select the value of k based on a minimum value of the third value, the minimum value of the third value occurring when k=K−1.

12. The network management system of claim 10, wherein the instructions to calculate the first value further comprise instructions to:

retrieve nonlinear transfer function integral values for each link from node 1 to node k;

add an accumulated term for phase shift by dispersion to each of the integral values for each link from node 1 to node k;

concatenate the integral values for each link from node 1 to node k;

multiply the concatenated integral values by a phase shift exponential term corresponding to a dispersion compensation module located at the spectral inversion node; and phase conjugate the integral values for each link from node 1 to k.

* * * * *